United States Patent
Miyahara

(10) Patent No.: US 7,061,527 B2
(45) Date of Patent: Jun. 13, 2006

(54) IMAGE SENSING APPARATUS EMPLOYING PHOTOELECTRIC CONVERSION ELEMENTS

(75) Inventor: Hiroyuki Miyahara, Yokohama (JP)

(73) Assignee: Victor Company of Japan, Ltd., Yokohama (JP)

(*) Notice: Subject to any disclaimer, the term of this patent is extended or adjusted under 35 U.S.C. 154(b) by 773 days.

(21) Appl. No.: 09/899,537

(22) Filed: Jul. 6, 2001

(65) Prior Publication Data
US 2002/0054228 A1 May 9, 2002

(30) Foreign Application Priority Data
Jul. 6, 2000 (JP) ............... 2000-204918

(51) Int. Cl.
*H04N 5/225* (2006.01)
(52) U.S. Cl. .................................. 348/220.1
(58) Field of Classification Search ............... 348/312, 348/317, 316, 220.1, 311, 267; 257/213
See application file for complete search history.

(56) References Cited

U.S. PATENT DOCUMENTS

| | | | | |
|---|---|---|---|---|
| 5,251,036 A | * | 10/1993 | Kawaoka et al. ........... 348/311 |
| 5,440,343 A | * | 8/1995 | Parulski et al. ............. 348/316 |
| 5,528,291 A | * | 6/1996 | Oda ........................ 348/220.1 |
| 6,473,120 B1 | * | 10/2002 | Hirasawa et al. ......... 348/208.1 |

FOREIGN PATENT DOCUMENTS

JP 11-008801 1/1999

* cited by examiner

*Primary Examiner*—Ngoc-Yen Vu
*Assistant Examiner*—Anthony J. Daniels
(74) *Attorney, Agent, or Firm*—Connolly Bove Lodge & Hutz LLP

(57) ABSTRACT

In a motion picture taking mode, pixels in the area B are outputted as a motion picture. Electric charges from the area E are intercepted by the intercepting section D and not transmitted to the HCCD 3. In a still picture taking mode, pixels in all the areas are outputted as a still picture. Further, a center of optical axis is set to the position x1 in the motion picture taking mode, and set to the position x2 in the still picture taking mode.

1 Claim, 4 Drawing Sheets

IMAGE SENSING APPARATUS EMPLOYING PHOTOELECTRIC CONVERSION ELEMENTS

BACKGROUND OF THE INVENTION

1. Field of the Invention

The present invention relates to an image sensing apparatus being suitable for utilizing in a camera, which can take a motion picture and a still picture.

2. Description of the Related Art

There existed a solid state image sensing device as an image sensing apparatus being generally utilized in a video camera or like. FIG. 7 is a plan view of a solid state image sensing device partially enlarged. In FIG. 7, a solid state image sensing device is composed of a plurality of photoelectric converting elements 1, which converts an incident light into an electric signal and outputs, a vertical transmitting CCD (hereinafter referred to VCCD) 2, which transmits an electric charge outputted from the photoelectric converting element 1 in a vertical direction, and a horizontal transmitting CCD (hereinafter referred to HCCD) 3, which transmits the electric charge transmitted from the VCCD 2 in a horizontal direction. An electric charge transmitting method of a solid state image sensing device adopting a so-called progressive scan system, which can output a signal for one frame during a period of one field (hereinafter referred to 1 VD period) of television (TV) signal is explained briefly.

The photoelectric converting element 1 is disposed by, for example, 960 pixels in the horizontal direction and 640 pixels in the vertical direction. A reading out pulse is generated once a period of 1 VD of TV signal by a timing generator provided externally. All electric charges stored in each photoelectric converting element 1 are transmitted to the neighboring VCCD 2.

The VCCD 2 is stacked as a stage as many as a number of the photoelectric converting elements 1 disposed in the vertical direction. A stored electric charge is shifted in the HCCD 3 direction shown by an arrow V in FIG. 7 by one stage for a half period of one horizontal scanning period (hereinafter referred to 1 HD) of TV signal. In other words, an electric charge is shifted by two stages per 1HD period in order to be able to transmit electric charges equivalent to two lines per 1 HD period, that is, (960×2)=1920 pixels.

Further, the HCCD 3 is arranged as a stage as many as a number of the photoelectric converting elements 1 disposed in the horizontal direction. An electric charge from the VCCD 2 is transmitted in the horizontal direction shown by an arrow H in FIG. 7 and outputted from an outputting section 3 out to a picture signal processing section (not shown). A transmission rate of electric charge in the horizontal direction is set to a rate of transmitting electric charges equivalent to two lines per 1 HD period, that is, (960 pixels×2)=1920 pixels.

As mentioned above, in a case of utilizing a solid state image sensing device arranged by photoelectric converting elements 1 disposed by 960 pixels in the horizontal direction and 640 pixels in the vertical direction, a signal equivalent to 640 lines can be outputted if signals of all lines in the vertical direction are outputted. However, in a case of a TV signal of the NTSC system, for example, a number of horizontal scanning lines is 525 lines. Therefore, signals of all lines are not necessary to be outputted from a solid state image sensing device.

That is to say, in a case of outputting a signal as a TV signal of the NTSC system, it is sufficient to output a signal equivalent to 525 lines allocated in a vicinity of center of a picture composed of 640 lines vertically. Further, in a case of assuming that a signal equivalent to 2 lines per 1 HD period is outputted, since 1 HD period is equal to 63.5 μs, an electric charge can be horizontally transmitted by a clock of (960 pixels ×2÷63.5 μs)=30.24 MHz.

In addition thereto, another photoelectric converting element (not shown) for outputting an optical black (OB) signal is generally provided on the right and left sides of a solid state image sensing device in order to set a black level of a signal to be outputted by a photoelectric converting element. The OB signal is also transmitted through the VCCD 2 and the HCCD 3, so that a clock actually utilized is a little higher frequency than 30.24 MHz.

The above-mentioned description is one example of outputting a signal obtained from a solid state image sensing device as a motion picture signal such as a TV signal. However, there existed a video camera having a function of electronic still camera. Such a video camera outputs a TV signal by using a signal equivalent to 525 lines, for example, when outputting a motion picture. On the other hand, when outputting a still picture, one still picture can be obtained by outputting signals of all lines.

Recently, a still picture taken by a video camera is demanded for higher resolution. In order to obtain a still picture in high resolution, it is necessary for a solid state image sensing device to increase a number of pixels.

In a case of utilizing a solid state image sensing device composed of the photoelectric converting elements 1 disposed by, for example, 960 pixels in the horizontal direction and 640 pixels in the vertical direction, a still picture equivalent to approximately six hundred thousand pixels can be obtained. However, in a case of a still picture equivalent to approximately six hundred thousand pixels, printing the still picture with enlarged by using a home use printer can not obtain a picture in sufficient picture quality as a particle of pixel is extremely conspicuous.

Further, there existed various signal systems other than the NTSC system. In a case that a number of pixels of a solid state image sensing device is increased in the horizontal and vertical directions, a motion picture in other signal system than the NTSC system can be outputted. For example, in a case of considering a solid state image sensing device composed of the photoelectric converting elements 1 disposed by 1280 pixels in the horizontal direction and 720 pixels in the vertical direction, a motion picture by a system of progressively scanning 720 effective scanning lines by a frame frequency of 30 Hz, that is, the 720p/30 frame system can be outputted. However, in order to output such a motion picture, it is necessary for a solid state image sensing device to increase a number of pixels in the horizontal and vertical directions.

For the reason mentioned above, a solid state image sensing device having a large number of pixels is required. However, in a case that a number of pixels is increased, it is necessary for pixels to be horizontally transmitted furthermore during 1 HD period, so that a transmission rate of electric charge in the HCCD 3 must be increased. For example, with assuming that a number of pixels to be horizontally transmitted during 1 HD period is (1280×2) =2560 pixels, since 1 HD period is equal to 63.5 μs, a horizontal transmission rate becomes (1280 pixels×2÷63.5 μs)=40.34 MHz. However, if a transmission rate of electric charge in the HCCD 3 is increased such as mentioned above, there is existed a problem such that power consumption of the HCCD 3 increases. Further, a signal to noise ratio is deteriorated by heat generation of the solid state image sensing device.

With respect to a solid state image sensing device, which can decrease a horizontal transmission rate of electric charge in the HCCD 3, a specific type of solid state image sensing device, which is equipped with two HCCDs and transmits electric charges through a different HCCD 3 in an even number line and an odd number line respectively, is available in a market. However, this type of solid state image sensing device is required to be installed with two HCCDs and to transmit electric charges from the VCCD with distributing the electric charges to two HCCDs. Accordingly, there is existed a further problem such that it is hard to increase pixels more.

SUMMARY OF THE INVENTION

Accordingly, in consideration of the above-mentioned problems of the prior art, an object of the present invention is to provide an image sensing apparatus, which can realize to make pixels increased without increasing a transmission rate of electric charge in a horizontal transmitting CCD and can output a picture of various signal systems.

In order to achieve the above abject, the present invention provides, according to an aspect thereof, an image sensing apparatus, which outputs electric charges being stored in a plurality of photoelectric converting elements disposed horizontally and vertically in a matrix as an electric signal, the image sensing apparatus comprising: a plurality of vertical transmitting CCDs (charge coupled devices) for transmitting electric charges read out from the plurality of vertical transmitting CCDs in a vertical direction; a horizontal transmitting CCD (charge coupled device) for transmitting the electric charges transmitted from the plurality of vertical transmitting CCDs in a horizontal direction and for outputting the electric charge to an external through an outputting section; and an intercepting section of being able to intercept a part of electric charges being transmitted to a farther side from the outputting section of the horizontal transmitting CCD out of the electric charges transmitted from the plurality of vertical transmitting CODs to the horizontal transmitting CCD, the image sensing apparatus is characterized in that a picture signal obtained from a first area is outputted with being intercepted by the intercepting section in a first picture taking mode, and that another picture signal obtained from a second area being wider in a horizontal direction than the first area is outputted without being intercepted by the intercepting section in a second picture taking mode.

Other object and further features of the present invention will be apparent from the following detailed description when read in conjunction with the accompanying drawings.

DETAILED DESCRIPTION OF THE PREFERRED EMBODIMENTS

First Embodiment

Figure 1:
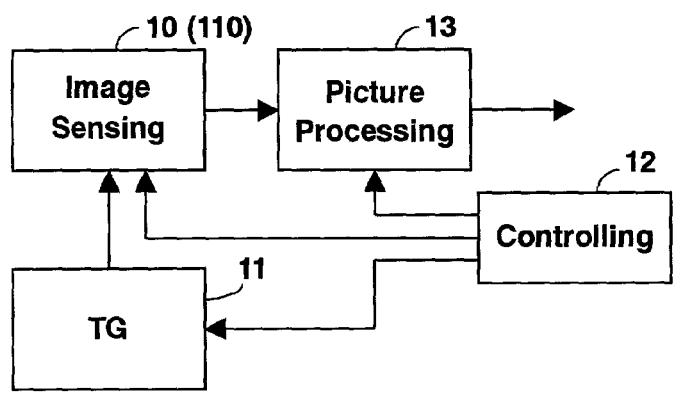
FIG. 1 is a block diagram of an image sensing apparatus according to an embodiment of the present invention.

FIG. 1 is a block diagram of an image sensing apparatus according to an embodiment of the present invention.

Figure 2:
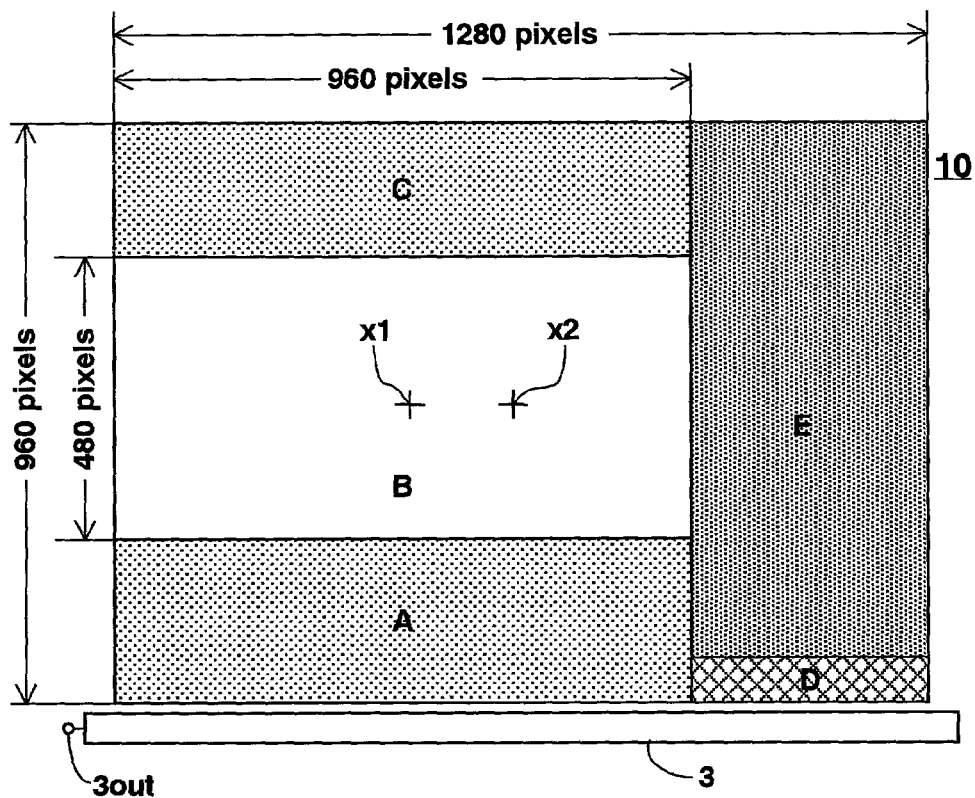
FIG. 2 is a diagram for explaining an image sensing area of a solid state image sensing device according to a first embodiment of the present invention.

FIG. 2 is a diagram for explaining an image sensing area of a solid state image sensing device according to a first embodiment of the present invention.

FIGS. 3(*a*) to 3(*d*) are diagrams for explaining operations in a motion picture taking mode of the image sensing apparatus according to the present invention.

FIGS. 4(*a*) to 4(*d*) are diagrams for explaining operations in a still picture taking mode of the image sensing apparatus according to the present invention.

FIGS. 5(*a*) to 5(*d*) are diagrams for explaining operations in a high definition motion picture taking mode of the image sensing apparatus according to the present invention.

In FIG. 1, an image sensing apparatus is composed of a solid state image sensing device 10, a timing generator (TG) 11, a controlling section 12, and a picture processing section 13. The TG 11 outputs various signals to the solid state image sensing device 10. The controlling section 12 controls the solid state image sensing device 10, the TG 11, and a picture processing section 13 in accordance with a picture taking mode. The picture processing section 13 processes and outputs a signal outputted from an output section (not shown) of the solid state image sensing device 10 in accordance with control of the control section 12.

The solid state image sensing device 10 is defined as a solid state image sensing device, which can output a signal equivalent to one frame during 1 VD period of television (TV) signal, that is, a solid state image sensing device of the progressive scan system, wherein 1 VD period represents a period of one field of TV signal in the NTSC system.

Figure 7:
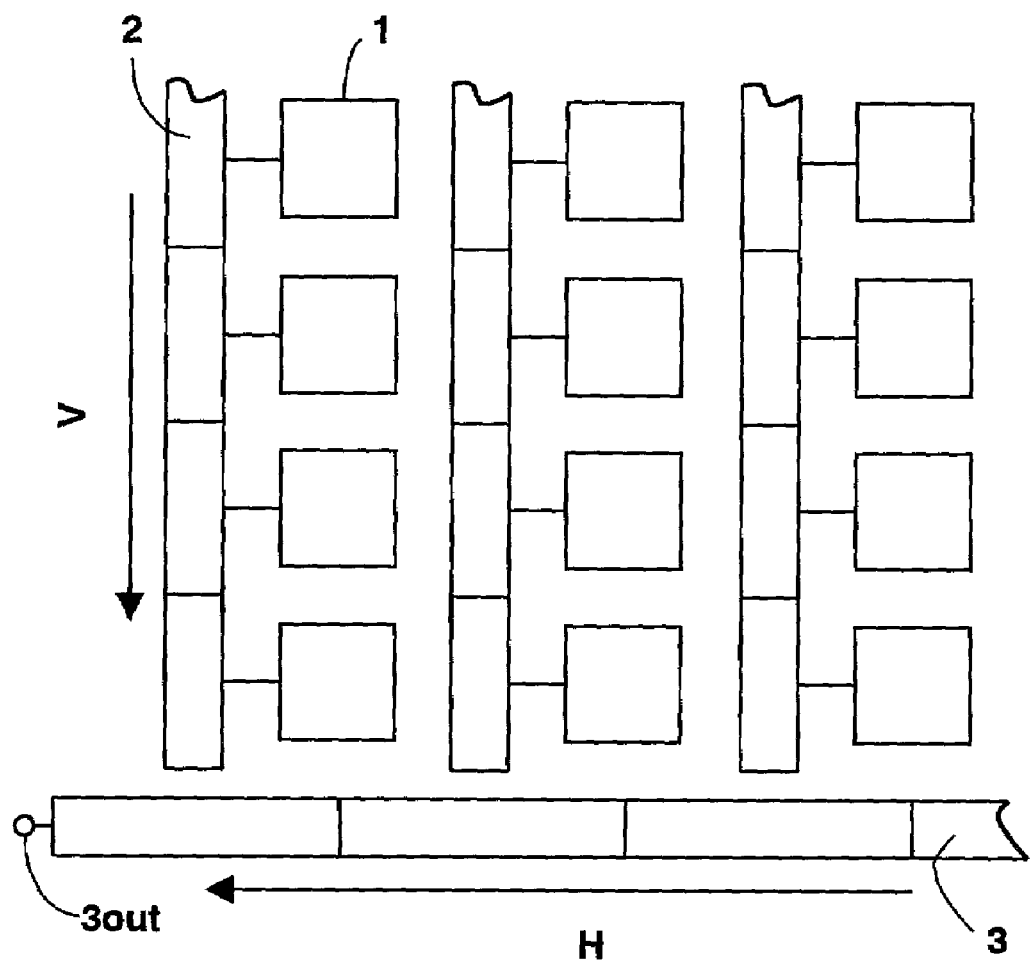
FIG. 7 is a plan view of a solid state image sensing device partially enlarged.

Configuration-wise, the solid state image sensing device 10 is basically similar to the solid state image sensing device of the prior art. As shown in FIG. 7, the solid state image sensing device 10 is composed of a plurality of photoelectric converting elements 1, which converts an incident light into an electric signal and outputs, a vertical transmitting CCD (hereinafter referred to VCCD) 2, which transmits an electric charge outputted from the photoelectric converting element 1 in a vertical direction, and a horizontal transmitting CCD (hereinafter referred to HCCD) 3, which transmits the electric charge transmitted from the VCCD 2 in a horizontal direction. In a case of the solid state image sensing device 10, as shown in FIG. 2, total image sensing area is divided into five areas A through E and the photoelectric converting element 1 is disposed by 1280 pixels in the horizontal direction and 960 pixels in the vertical direction in a matrix. The image sensing apparatus of the present invention is provided with a motion picture taking mode for outputting a TV signal and a still picture taking mode for outputting a still picture. In the motion picture taking mode, an electric charge from the area B shown in FIG. 2 is utilized for generating a TV signal. In the still picture taking mode, electric charges from all the areas A through E are utilized for generating a still picture.

In FIG. 2, the areas A, C and E are an area for outputting an electric charge, which is not utilized for generating a TV signal while taking a picture in the motion picture taking mode. The area D is an area for intercepting transmission of an electric charge from the area E while taking a picture in the motion picture taking mode. Therefore, transmitting an electric charge in the HCCD 3 to a farther side from an outputting section 3 out, that is, toward a direction opposite to an arrow H direction shown in FIG. 7 is intercepted. A cross mark x1 in the area B is a center of an optical axis of lens in the motion picture taking mode and another cross mark x2 is a center of the optical axis of lens in the still picture taking mode.

Operations of the image sensing apparatus of the present invention is depicted in a sequence of the motion picture taking mode and the still picture taking mode. In the motion picture taking mode, the control section 12 shown in FIG. 1 controls the TG 11 and the TG 11 outputs a driving pulse to the solid state image sensing device 10. The driving pulse includes a reading out pulse for an electric charge from the photoelectric converting element 1, a vertical transmitting pulse for the VCCD 2, and a horizontal transmitting pulse for the HCCD 3. Further, the controlling section 12 shifts the solid state image sensing device 10 so as to coincide the center of the optical axis of lens with the cross mark x1 shown in FIG. 2 and also controls the solid state image sensing device 10 so as for the area D to function as an intercepting section of intercepting an electric charge of the VCCD 2.

When the TG 11 outputs a reading out pulse to the solid state image sensing device 10, electric charges stored in the photoelectric converting elements 1 in all the areas A through E are transmitted to the adjacent VCCD 2. The electric charges stored in the VCCDs 2 are shifted in the HCCD 3 direction at timing when a vertical transmitting pulse is outputted from the TG 11. Since an electric charge outputted from the photoelectric converting element 1 in the area A is not necessary to generate a TV signal, the TG 11 outputs a vertical transmitting pulse in a high speed during a period of transmitting all electric charges from the area A to the HCCD 3. A horizontal transmitting pulse is supplied to the HCCD 3. The horizontal transmitting pulse is set to a rate of being able to transmit electric charges equivalent to 1920 pixels during 1 HD period, wherein 1 HD represents one horizontal scanning period of horizontal scanning line signal of TV signal in the NTSC system.

At a time immediately before an electric charge outputted from the photoelectric converting element 1 allocated at a bottom end of the area B is transmitted to the HCCD 3, the vertical transmitting pulse is set to a rate of shifting a stored electric charge in the HCCD 3 direction one stage by one stage during one half of 1HD period of TV signal. In other words, since the rate is set to shifting an electric charge by 2 stages during 1HD period, all electric charges from the area B are transmitted to the HCCD 3 with spending (480 lines÷2)=240 HD period.

During a period of transmitting electric charges from the area B to the HCCD 3, as the HCCD 3 is supplied with a horizontal transmitting pulse having a rate of being able to transmit electric charges equivalent to 1920 pixels per 1 HD period, electric charges equivalent to 1920 pixels per 1 HD period are outputted to the HCCD 3. Further, when transmission of electric charges from the area B to the HCCD 3 is completed, the TG 11 outputs a high speed vertical transmitting pulse once again. Then, all electric charges from the remaining area C are transmitted to the HCCD 3 in a high speed. On the other hand, an electric charge from the area E is totally intercepted by the intercepting section of the area D during these periods. Therefore, no electric charge from the area E is transmitted to the HCCD 3 at all.

Figure 3A:
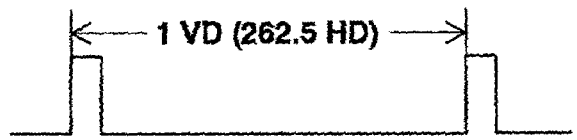
FIGS. 3(*a*) to 3(*d*) are diagrams for explaining operations in a motion picture taking mode of the image sensing apparatus according to the present invention.
Figure 3B:
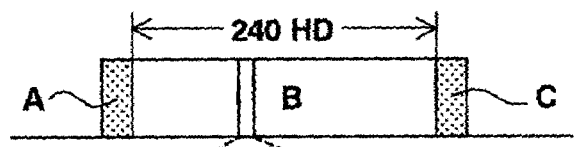
Figure 3C:
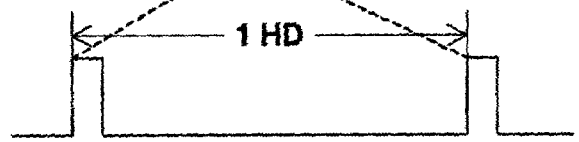
Figure 3D:
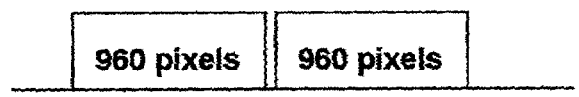

FIGS. 3(a) to 3(d) are diagrams for explaining operations in a motion picture taking mode of the image sensing apparatus of the present invention. FIG. 3(a) shows 1 VD period. FIG. 3(b) shows an output from the solid state image sensing device 10 during 1 VD period. FIG. 3(c) shows 1 HD period. FIG. 3(d) shows an output from the solid state image sensing device 10 during 1 HD period.

As mentioned above, during a period of transmitting all electric charges of the area A to the HCCD 3 after a reading out pulse is generated, since a vertical transmitting pulse for the VCCD 2 is extremely in a high speed, an electric charge from the area A is outputted in a short period of time as shown in FIG. 3(b). Further, since the vertical transmitting pulse is extremely in a high speed after all electric charges from the area B are transmitted to the HCCD 3, as shown in FIG. 3(b), an electric charge from the area C is also outputted in a short period of time.

On the other hand, since an electric charge from the area B is transmitted to the HCCD 3 by two stages per 1 HD period, electric charges equivalent to 480 stages are transmitted to the HCCD 3 with spending 240 HD period as shown in FIG. 3(b). The HCCD 3 outputs electric charges equivalent to 480 lines during this period of 240 HD with defining 960 pixels in the horizontal direction as one line. Further, as shown in FIG. 3(d), during 1 HD period of outputting an electric charge from the area B, the HCCD 3 outputs electric charges equivalent to two lines with defining 960 pixels in the horizontal direction as one line.

With respect to electric charges outputted from the solid state image sensing device 10 during an electric charge outputting period of the areas A and C shown in FIG. 3(b), the electric charges are outputted to the picture processing section 13 as same manner as those from the area B. However, the picture processing section 13 generates and outputs a TV signal by using only electric charges in the area B in response to a controlling signal from the controlling section 12.

As mentioned above, in the motion picture taking mode, electric charges from the areas D and E are not transmitted to the HCCD 3. Actually, the HCCD 3 horizontally transmits only electric charges from the areas A, B and C, so that the HCCD 2 can transmit electric charges in the HCCD 3 by using a horizontal transmitting pulse having a same frequency as a VCCD in a solid state image sensing device disposed by 960 pixels in the horizontal direction. In other words, a horizontal transmission rate is (960 pixels×2÷63.5 µs)=30.24 MHz with defining that 1 HD is equal to 63.5 µs. In a case of considering transmission of an OB (optical black) signal, an electric charge can be horizontally transmitted at a frequency slightly higher than 30.24 MHz.

A motion picture signal taken by the above mentioned motion picture taking mode can be outputted as a TV signal with progressively scanning 480 effective scanning lines by a frame frequency of 60 Hz, that is, a TV signal of the 480p system, or can also be outputted as a TV signal with interleave scanning 480 effective scanning lines by a field frequency of 60 Hz, that is, a TV signal of the 480i system.

Further, in the above mentioned motion picture taking mode, a compensation process for vibration by hand can be performed by using the solid state image sensing device 10. By supplying information related to a direction of vibration by hand and an amount of the vibration to the controlling section 12 and by changing timing of a vertical transmitting pulse outputted by the TG 11, the vibration by hand can be compensated by shifting the area B in the vertical direction.

Furthermore, in a case that a photoelectric converting element for compensating vibration by hand is disposed on the left side of the picture tasking areas A through E shown in FIG. 2 or the photoelectric converting element is allocated in a position provided by shifting the area B to the right slightly, it is apparent that vibration by hand in the horizontal direction can also be compensated by using the solid state image sensing device 10.

A still picture taking mode is depicted next. In the still picture taking mode, electric charges from all the areas A through E shown in FIG. 2 are utilized for producing a still picture as mentioned above. Therefore, the controlling section 12 controls the solid state image sensing device 10 so as to function as same manner as photoelectric converting elements in the areas other than the area D, and not so as for the area D to intercept an electric charge in the VCCD 2. Further, the controlling section 12 shifts the solid state image sensing device 10 in order to coincide a center of an optical axis of lens with the. cross mark x2 shown in FIG. 2. The TG 11 outputs a reading out pulse for electric charge and a vertical transmitting pulse for the VCCD 2 and a horizontal transmitting pulse for the HCCD 3 to the solid state image sensing device 10 in accordance with controlling by the controlling section 12.

In the still picture taking mode, the reading out pulse is outputted to the solid state image sensing device 10 only one time. Electric charges stored in the photoelectric converting elements 1 in all the areas A through E are transmitted to the adjacent VCCDs 2 at a time when the reading out pulse is outputted. Moreover, since the vertical transmitting pulse supplied to the VCCD 2 is fixed to a rate of shifting an electric charge by three stages during 2 HD period of TV signal, electric charges equivalent to 960 stages are transmitted to the HCCD 3 with spending a period of 640 HD.

Figure 4A:
FIGS. 4(*a*) to 4(*d*) are diagrams for explaining operations in a still picture taking mode of the image sensing apparatus according to the present invention.
Figure 4B:
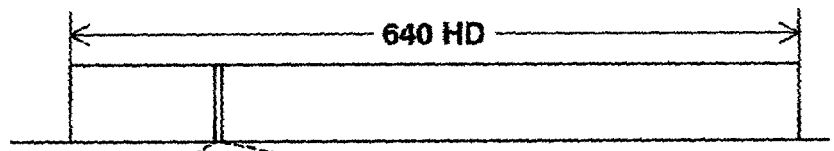
Figure 4C:
Figure 4D:
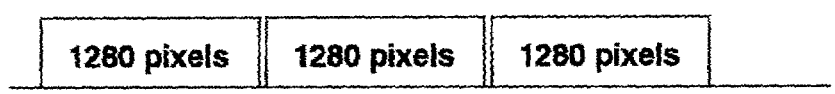

FIGS. 4(a) to 4(d) are diagrams for explaining operations in a still picture taking mode of the image sensing apparatus of the present invention. FIG. 4(a) shows 1 VD period of the TV signal. FIG. 4(b) shows a necessary time for the solid state image sensing device 10 in order to output a still picture. FIG. 4(c) shows a period of 2 HD. FIG. 4(d) shows an output from the solid state image sensing device 10 during a period of 2 HD.

On the other hand, the HCCD 3 is supplied with the horizontal transmitting pulse as same pulse as in the motion picture taking mode. Accordingly, as shown in FIG. 4(d), the HCCD 3 transmits 1920 pixels per 1 HD period of TV signal or 3840 pixels per 2HD period, that is, electric charges equivalent to 3 lines with defining that 1280 pixels in the horizontal direction is one line.

As mentioned above, since the solid state image sensing device 10 outputs all electric charges with spending a period of 640 HD, the solid state image sensing device 10 outputs one still picture during a plurality of VD periods of the TV signal. The solid state image sensing device 10 outputs electric charges equivalent to three lines during a period of 2 HD. Accordingly, by the above-mentioned operations, a still picture equivalent to approximately twelve hundred thousand pixels composed of 1280 pixels in the horizontal direction and 960 pixels in the vertical direction can be obtained.

In a case of utilizing the solid state image sensing device 10 shown in FIG. 2, the image sensing apparatus of the present invention can install a high definition motion picture taking mode, which outputs a high definition motion picture signal by a system of progressively scanning 720 effective scanning lines by a frame frequency of 30 Hz, that is, the 720p/30 frame system. The high definition motion picture taking mode is depicted hereinafter.

In the high definition motion picture taking mode, electric charges equivalent to 720 lines with defining that 1208 pixels in the horizontal direction shown in FIG. 2 is one line, or a slightly larger number of lines than 720 lines are outputted during a period of 2 HD. Therefore, the area D never intercept an electric charge of the VCCD 2 as same manner as the still picture taking mode.

Further, with respect to the center of the optical axis of lens, it is set to the cross mark x2 as same manner as the still picture taking mode. The TG 11 outputs a reading out pulse for electric charge and a vertical transmitting pulse for the VCCD 2 and a horizontal transmitting pulse for the HCCD 3 to the solid state image sensing device 10 in accordance with controlling by the controlling section 12.

When the reading out pulse is outputted from the controlling section 12, electric charges stored in the photoelectric converting elements 1 in all the areas A through E are transmitted to the adjacent VCCDs 2. Then, the electric charges stored in the VCCDs 2 are shifted to the HCCD 3 direction at a time when the TG 11 outputs the vertical transmitting pulse.

Figure 5A:
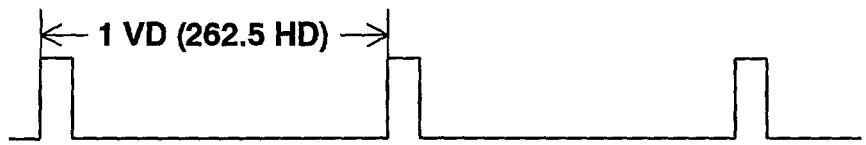
FIGS. 5(*a*) to 5(*d*) are diagrams for explaining operations in a high definition motion picture taking mode of the image sensing apparatus according to the present invention.
Figure 5B:
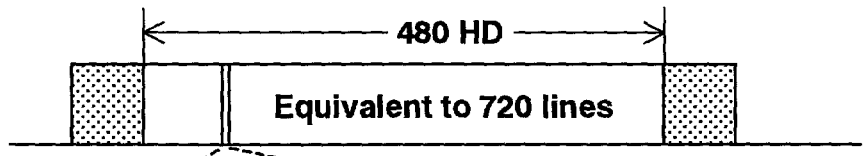
Figure 5C:
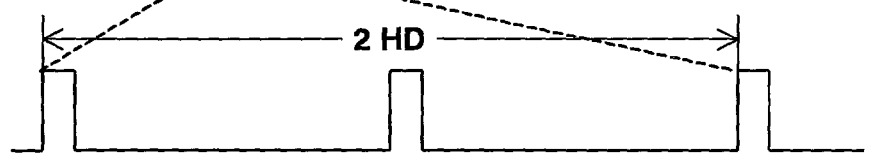
Figure 5D:

FIGS. 5(a) to 5(d) are diagrams for explaining operations in the high definition motion picture taking mode of the image sensing apparatus of the present invention. FIG. 5(a) shows 1 VD period of the TV signal. FIG. 5(b) shows an output of the solid state image sensing device 10 during a period of 2 VD. FIG. 5(c) shows a period of 2 HD. FIG. 5(d) shows an output from the solid state image sensing device 10 during a period of 2 HD.

Further, when electric charges equivalent to 720 lines allocated in a vicinity of center of image sensing area of the solid state image sensing device 10, the vertical transmitting pulse is set to a rate of transmitting an electric charge by three stages during 2 HD period of TV signal. In other words, since the electric charges are shifted by three stages per 2 HD period, the electric charges equivalent to 720 stages, that is, equivalent to 720 lines are transmitted to the HCCD 3 with spending a period of 480 HD as shown in FIG. 5(b).

Furthermore, with respect to a total of 240 lines out of 960 lines allocated above and under the 720 lines, since the vertical transmitting pulse is set to an extremely high rate, electric charges equivalent to the 240 lines are transmitted during a remaining period of subtracting a period of 480 HD required for transmitting 720 lines from 2 VD period of the TV signal.

Moreover, the HCCD 3 is supplied with the horizontal transmitting pulse as same as that of the motion picture taking mode and the still picture taking mode. Accordingly, the HCCD 3 transmits 1920 pixels per 1 HD period of TV signal or 3840 pixels per 2HD period, that is, electric charges equivalent to 3 lines with defining that 1280 pixels in the horizontal direction is one line as shown in FIG. 5(d). In addition thereto, by setting the horizontal transmitting pulse to the same frequency for each picture taking mode, a configuration of the picture processing section 13 being supplied with an output signal of the HCCD 3 can be simplified.

As mentioned above, in the high definition motion picture taking mode, a motion picture signal in high definition composed of two times a number of pixels per one frame in comparison with the motion picture taking mode can be outputted although a number of frames per one second is one half of that of the motion picture taking mode. When outputting such a motion picture signal, a frequency of the horizontal transmitting pulse in the HCCD 3 can be set to more than 30.24 MHz.

In a case that vibration by hand in the vertical direction of a picture signal outputted by the solid state image sensing device 10 is compensated by using a memory device (not shown) or like, a number of lines slightly larger than 720 lines is required to be outputted. In this case, with respect to 730 lines, for example, adjacent to a center of image sensing area, electric charges equivalent to 730 lines can be transmitted to the HCCD 3 by three stages during 2 HD period of the TV signal and remaining electric charges equivalent to 230 lines allocated above and under the 730 lines can be transmitted during a remaining period of 2 VD period of the TV signal.

Second Embodiment

Figure 6:
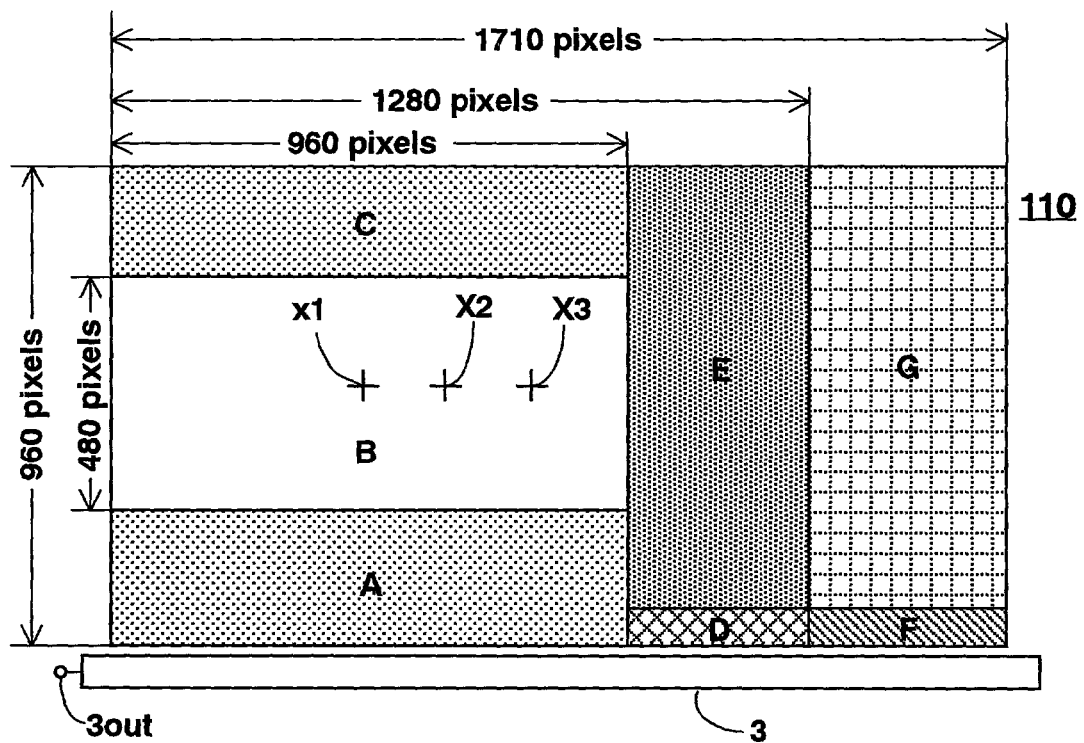
FIG. 6 is a diagram for explaining an image sensing area of a solid state image sensing device according to a second embodiment of the present invention.

FIG. 6 is a diagram for explaining an image sensing area of a solid state image sensing device according to a second embodiment of the present invention. In an image sensing apparatus of the second embodiment of the present invention, a solid state image sensing device 110 of which a number of pixels in the horizontal direction is increased in comparison with the solid state image sensing device 10 of the first embodiment is utilized. The image sensing apparatus of the second embodiment is provided with a motion picture taking mode, a first still picture taking mode, and a second still picture taking mode. The aforementioned high definition motion picture taking mode can be added thereto. As shown in FIG. 6, the solid state image sensing device 110 is composed of areas A through G and is identical with the solid state image sensing device 10 except the areas F and G, which are allocated on the right side of the image sensing area of the solid state image sensing device 10.

The motion picture taking mode is similar to that of the first embodiment. The first still picture taking mode is similar to the still picture taking mode of the first embodiment. Actually, as shown in FIG. 6, in the motion picture taking mode, a cross mark x1 is a center of optical axis, and areas D and F are intercepting sections. An electric charge from an area B is utilized for generating a TV signal. In the first still picture taking mode, a cross mark x2 is a center of optical axis and the area F is the intercepting section. Electric charges from areas A through E are utilized for producing a still picture.

Further, in the second still picture taking mode, a cross mark x3 is a center of optical axis and electric charges from all areas A through G are utilized for producing a still picture. Therefore, a motion picture can be taken without increasing a frequency of the horizontal transmitting pulse for the HCCD 3 as same as the first embodiment. Furthermore, in a case of taking a picture by the first still picture taking mode, a still picture can be outputted in a same period of time as that of taken by the solid state image sensing device 10 of the first embodiment although the solid state image sensing device 110 disposed by 1710 pixels in the horizontal direction is utilized. Moreover, in a case of taking a picture by the second still picture taking mode, a still picture equivalent to approximately sixteen hundred thousand pixels can be obtained by using all photoelectric converting elements provided in the solid state image sensing device 110.

While the invention has been described above with reference to specific embodiment thereof, it is apparent that many changes, modifications and variations in the arrangement of equipment and devices and in materials can be made without departing from the invention concept disclosed herein. For example, when taking a picture by each still picture taking mode, it is disclosed that the solid state image sensing device produces a still picture by using electric charges from all the photoelectric converting elements. However, it is not limited to the description. With respect to an area such as a peripheral section of the image sensing area, wherein an excellent signal characteristic is hardly obtained, it is apparent that a still picture can be produced by using electric charges from photoelectric converting elements in the areas except for such the peripheral section.

According to an aspect of the present invention, there provided an image sensing apparatus, which can output a picture signal in a short period of time. When taking a picture in a first picture taking mode, electric charges belonging to a second area and other areas than a first area are not transmitted to a horizontal transmitting CCD (HCCD), so that the image sensing apparatus can output a picture signal in a short period of time.

According to another aspect of the present invention, there provided an image sensing apparatus, which can prevent increasing of power consumption and degrading of a signal to noise (S/N) ratio. In any picture taking mode such as a motion picture taking mode, each still picture taking mode or a high definition motion picture taking mode, a transmission rate of electric charge in the HCCD is set to a same rate. Therefore, a driving pulse in a high frequency is not necessary to supply even though a number of pixels in the horizontal direction is increased. Accordingly, increasing of power consumption and degrading of a S/N ratio is prevented.

What is claimed is:

1. An image sensing apparatus comprising:
   a solid state image sensing device; and
   a controller for controlling said solid state image sensing device to move a first point disposed in an image sensing area of said solid state image sensing device to a center of an optical axis of a lens in a first picture taking mode and to move a second point different from said first position disposed in said image sensing area to the center of the optical axis of the lens in a second picture taking mode,
   said solid state image sensing device further comprising:
   a plurality of vertical transmitting CCDs (charge coupled devices) for transmitting electric charges read out from said plurality of photoelectric converting elements in a vertical direction;
   a horizontal transmitting CCD (charge coupled device) for transmitting the electric charges transmitted from said plurality of vertical transmitting CCDs in a horizontal direction and for outputting the electric charge through an outputting section; and
   an intercepting section for intercepting all electric charges being transmitted from a whole area in a matrix of a plurality of photoelectric converting elements in the horizontal direction and a plurality of photoelectric converting elements in the vertical direction, wherein the area is a part of said image sensing area disposed only on a side further from and never on a side nearer to said outputting section of said horizontal transmitting CCD, and
   wherein a picture signal obtained from a first area is outputted with being intercepted by said intercepting sectioning said first picture taking mode, and wherein another picture signal obtained from a second area being wider in a horizontal direction than said first area is outputted without being intercepted by said intercepting section in said second picture taking mode, and wherein said first picture taking mode is a motion picture taking mode and said second picture taking mode is a high definition motion picture taking mode for generating a high definition motion picture signal of which a number of pixels per one frame is larger than that of said motion picture signal, and wherein a transmission rate of electric charge of said horizontal transmitting CCD is set to a same rate in said motion picture taking mode and in said high definition motion picture taking mode.

* * * * *